United States Patent [19]

Matsumura et al.

[11] 4,088,909
[45] May 9, 1978

[54] STEPPING MOTOR FOR TIMEKEEPING MECHANISM

[75] Inventors: Yasuhiro Matsumura; Shigeki Hata, both of Omiya, Japan

[73] Assignee: Kanto Seiki Company, Limited, Omiya, Japan

[21] Appl. No.: 770,274

[22] Filed: Feb. 18, 1977

[51] Int. Cl.² .......................................... H02K 37/00
[52] U.S. Cl. ................................... 310/49 R; 310/163
[58] Field of Search .......................... 310/49, 162–165, 310/156, 254; 318/128–132

[56] References Cited

U.S. PATENT DOCUMENTS

| 2,122,374 | 6/1938 | Kohlhagen | 310/163 |
| 2,864,018 | 12/1958 | Aeschmann | 310/163 |
| 3,435,311 | 3/1969 | Matsuzawa et al. | 318/129 |
| 3,597,915 | 8/1971 | Aizawa et al. | 310/49 UX |
| 3,626,263 | 12/1971 | McBride | 310/49 X |
| 3,818,690 | 6/1974 | Schwarzschild | 310/49 X |
| 3,949,251 | 4/1976 | Takatsuki | 310/49 |
| 3,989,967 | 11/1976 | Kikuyama et al. | 310/49 |

Primary Examiner—Donovan F. Duggan
Attorney, Agent, or Firm—Morris Liss

[57] ABSTRACT

A stepping motor includes a rotor formed of ferromagnetic material having a plurality of circumferentially alternately arranged poles of opposite polarities and a stator having main poles which are polarized in opposite polarities by successive drive pulses of opposite senses. An auxiliary stator pole is provided between adjacent main stator poles to give rise to a thrust that causes the rotor to rotate a small angle in the direction of rotation during the interval between successive drive pulses so that upon polarization of the stator by a subsequent drive pulse the rotor is easily caused to rotate in the same direction of rotation.

11 Claims, 8 Drawing Figures

STEPPING MOTOR FOR TIMEKEEPING MECHANISM

FIELD OF THE INVENTION

The present invention relates generally to stepping or pulse driven motors, and in particular to a stepping motor for use with timepieces. The present invention is particularly suitable for applications where electrically and mechanically rigorous conditions will be encountered.

BACKGROUND OF THE INVENTION

The prior art stepping motor includes a rotor formed of ferromagnetic material having a plurality of alternately circumferentially arranged oppositely magnetized poles and a stator having a plurality of identical poles extending inwardly to the pivot point of the rotor. The stator is polarized in opposite polarities in response to driving electrical pulses to generate moment that causes the rotor to rotate in a predetermined direction through a predetermined angle in step with the applied drive pulse. It is therefore necessary that its direction of rotation be invariable irrespective of its operating conditions, whether mechanical or electrical. However, the stator of the prior art stepping motor is constructed in a symmetrical configuration so that during the interval between successive driving pulses, the direction of rotation would become indeterminate when the rotor has been displaced from the neutral position by an external shock. If the direction of the displacement is opposite to the intended direction of rotation, the subsequent drive pulse will cause the rotor to rotate in the opposite direction.

Although such reverse rotation of the rotor may be prevented by the provision of a ratchet-and-pawl arrangement, such an approach will not only increase the complexity of the motor mechanism, but also will impose some degree of restriction to the rotational moment, thereby raising the minimum operating threshold voltage of the motor. When the stepping motor is to be used in a timepiece for automotive vehicles, the invariability of the direction of rotation and the minimum operating voltage of the drive pulse are of primary concern.

SUMMARY OF THE INVENTION

An object of the present invention is to provide an improved stepping motor for particular use with vehicle timepieces which ensures invariable direction of rotation even when mechanical shock is applied.

Another object of the invention is to provide an improved stepping motor which ensures invariable direction of rotation even when the source voltage is lowered.

A further object of the invention is to provide a stepping motor which is simple in construction and easy to manufacture.

The objects as stated above are realized by an auxiliary or intermediate stator pole having a predetermined arcuate or circumferential extent smaller than that of the main stator poles. The auxiliary stator pole is located in such position relative to the adjacent poles that during the interval between successive drive pulses the magnetic flux in the stator poles tends to approach to the maximum permeance value. As a result, the rotor will rotate further in the direction of rotation after the application of the last drive pulse to such a degree that the rotor is positioned angularly slightly displaced from the center axes of the main stator poles of the stator. Therefore, the rotor is biased in the direction of rotation in the absence of the drive pulses, so that upon a subsequent drive pulse the rotor is easily caused to rotate in the same direction.

BRIEF DESCRIPTION OF THE DRAWINGS

These and other objects, features and advantages of the present invention will be understood from the following description taken in conjunction with the accompanying drawings, in which.

DESCRIPTION OF THE PREFERRED EMBODIMENTS

Figure 1:
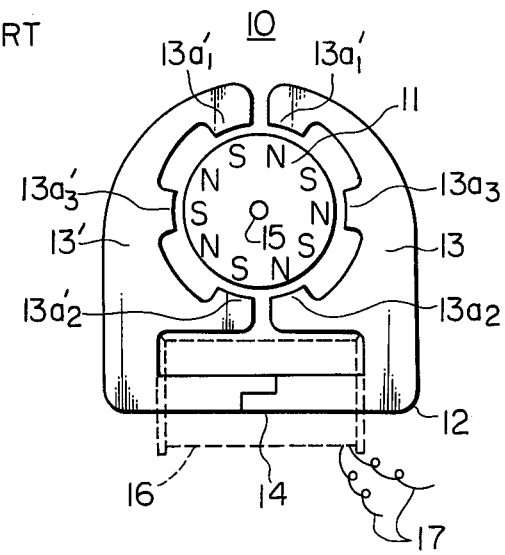
FIG. 1 is a diagrammatic view of a prior art stepping motor having identical stator poles.

Before proceeding into the description of the present invention, reference is first had to FIG. 1 wherein a prior art stepping motor for timepiece application is illustrated. As seen in FIG. 1 the stepping motor 10 comprises a rotor 11 and a stator 12 shaped into a pair of identical structural members 13 and 13' connected at their base portions by a horizontal member 14. Each of the structural members 13 and 13' is integrally formed with circumferentially spaced apart stator poles $13a_1$, $13a_2$ and $13a_3$ (the corresponding poles of the member 13' being indicated with the same but primed numerals) projecting inwardly toward the center of rotation of the rotor 11 as indicated at 15. Each of these stator poles has equal arcuate extent and the stator poles $13a_3$ and $13a_3'$ are equally spaced from the adjacent stator poles. The rotor 11 is formed of ferromagnetic material and provided with alternately equally spaced apart oppositely magnetized areas or poles, 10 in number, indicated by N and S on the circumference thereof. It will be noted in FIG. 1 that the stator poles of member 13 are so constructed as to associate with the rotor poles of the same polarity (N in this instance) and the stator poles of the other member 13' are to associate with those of the opposite polarity (S in this instance). The horizontal member 14 is wound with a coil 16 which is energized by current supplied through leads 17 connected to a pulse generating source (not shown). When the coil 16 is energized by a current pulse, the stator members 13 and 13' are excited in opposite polarities to cause the rotor 11 to rotate in a given direction. However, because of the equal arcuate extent of the stator poles and the equal spacing therebetween, there is a magnetically balanced equilibrium point when the rotor 11 is at rest during the interval between successive drive pulses. If, under this circumstance, the rotor is displaced from the equilibrium point by external force, the rotor may start rotating in the opposite direction to that intended. This problem becomes severe when the motor is used in vehicles.

Figure 2:
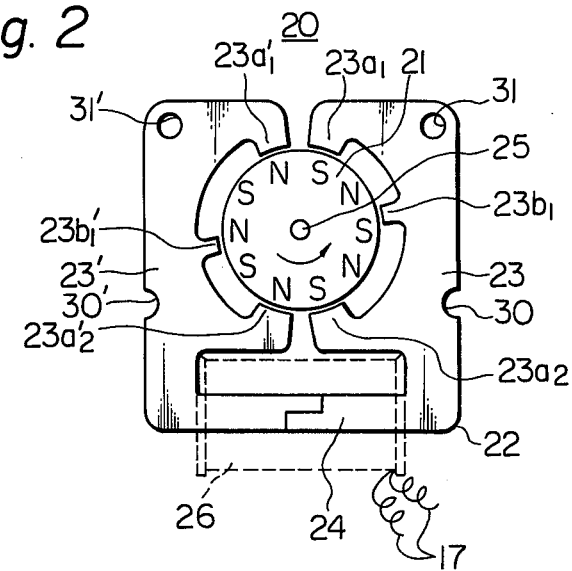
FIG. 2 is a diagrammatic view of an embodiment of the invention.

A stepping motor 20 embodying the present invention is shown in FIG. 2 as comprising a rotor 21 formed of ferromagnetic material and rotatable about its pivot point 25 and a stator 22 comprised by a pair of identically shaped structural members 23 and 23'. Each of the stator members 23 and 23' is shaped to provide a pair of inwardly projecting stator poles $23a_1$ and $23a_2$ (the corresponding poles of the member 23' being indicated by the same but primed numerals) of equal arcuate extent as the stator poles $13a_1$ and $13a_2$ ($13a_1'$ and $13a_2'$) of the prior art motor illustrated in FIG. 1, and an intermediate or auxiliary stator pole $23b_1$ ($23b_1'$). The structural members 23 and 23' are connected by a horizontal member 24 around which a coil 26 is wound in a manner identical to that described above.

Figure 3:
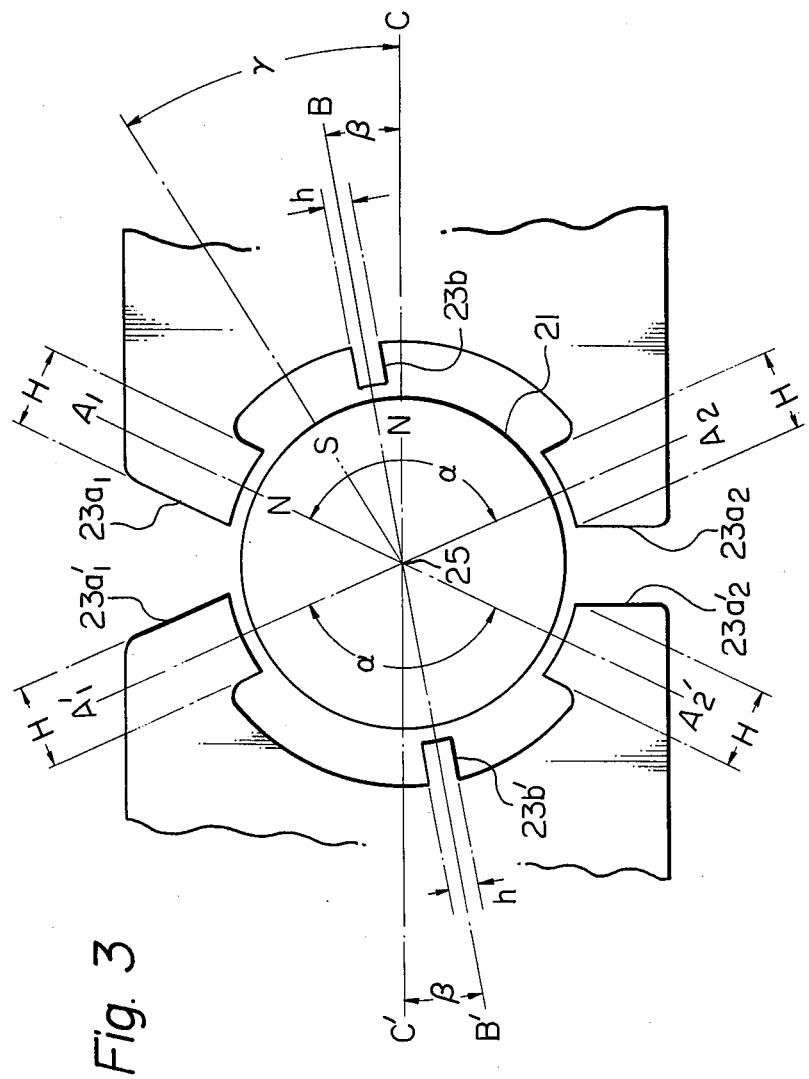
FIG. 3 is a portion of the stepping motor of FIG. 2 to illustrate the angular and dimensional relationships of the stator poles.

Referring to FIG. 3, the construction of the embodiment of FIG. 2 is shown in more detail. The stator poles $23a_1$ and $23a_2$ have an arcuate extent "H" and have their center axes $A_1$ and $A_2$ extending inwardly to meet at the center of rotation 25 at an angle $\alpha$ therebetween. The intermediate stator pole $23b$ has an arcuate extent "h" and its radial center axis B extends inwardly to point 25 at an angle of $\beta$ to a line C which bisects the angle $\alpha$. Similarly, the stator poles $23a_1'$ and $23a_2'$ have an arcuate extent "H" and have their radial center axes $A_1'$ and $A_2'$ extending inwardly to meet at point 25 at the angle $\alpha$. Similarly, the intermediate stator pole $23b'$ has an arcuate extent "h" and its radial center axis B' extends inwardly to point 25 at an angle of $\beta$ to the line C' which bisects the angle $\alpha$ formed by the lines $A_1'$ and $A_2'$.

Figure 4:
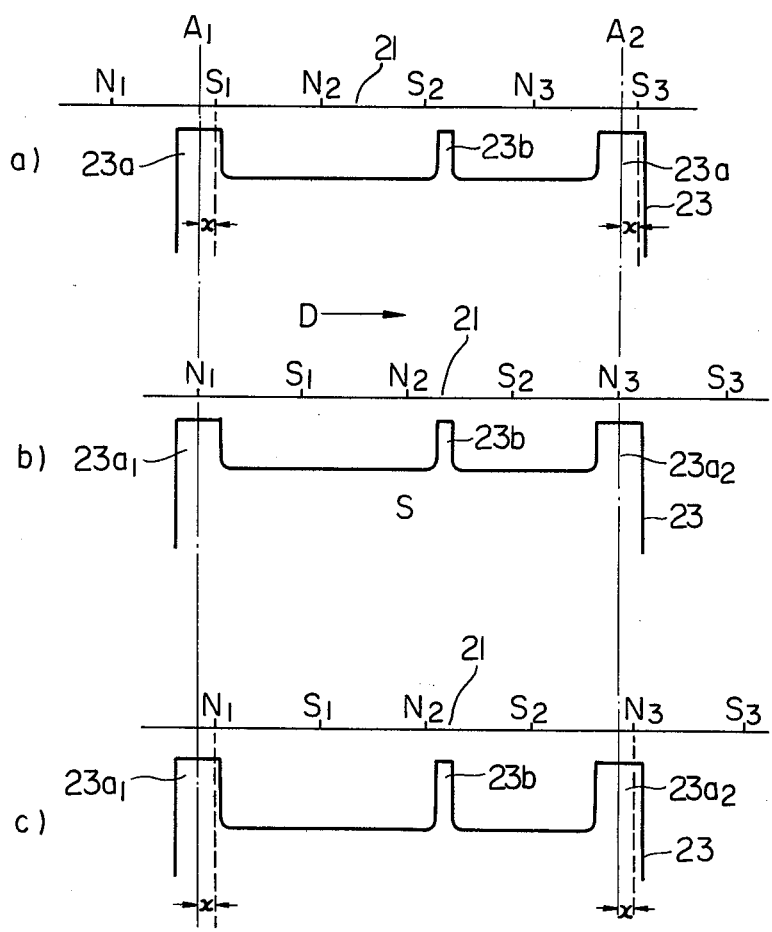
FIG. 4 is a schematic illustration of the principle of the present invention.

The operation of the stepping motor 20 of the invention will best be understood by reference to FIG. 4. The description is only limited to the operation of the rotor 21 with respect to the stator member 23, since the operation of the rotor 21 with respect to the stator member 23' is identical to that relative to stator member 23 because of the symmetrical arrangement of the stator poles. In FIG. 4a, it is assumed that coil 26 is not energized. The static magnetic field of the adjacent magnetic rotor poles of the rotor sets up a magnetic circuit in the stator member 23. Because of the unsymmetrical position of the intermediate stator pole $23b$ with respect to the main stator poles $23a_1$ and $23a_2$, there gives rise a thrust that causes the rotor 21 to rotate further until it comes to a position which gives a maximum permeance value to the magnetic circuit. Under these circumstances, the rotor pole $S_1$ is at a position displaced to the right from the center axis $A_1$ of the main stator pole $23a_1$ by an extent "x." Likewise, the rotor pole $S_3$ is equally displaced to the right from the center axis $A_2$ of the stator pole $23a_2$. With the rotor 21 so displaced as shown in FIG. 4a, it is assumed that the stator member 23 is polarized to the S pole upon energization of the coil 26 by a drive pulse. The rotor is caused to rotate in a direction as indicated by the arrow D as the rotor poles $N_1$ and $N_2$ are attracted by the poles $23a_1$ and $23a_2$, respectively, by a force which is much greater than the force of repulsion between the rotor pole $S_2$ and the intermediate stator pole $23b$ which tends to act the rotor to move in the opposite direction. The rotor then comes to a halt to the position as shown in FIG. 4b when rotor poles $N_1$ and $N_3$ are aligned respectively with the center axes $A_1$ and $A_2$. Upon deenergization of the coil 26, the rotor 21 drifts in the same direction of rotation as shown in FIG. 4c in order to provide a maximum permeance value to the magnetic circuit present in the stator member 23 by the same extent "x" as indicated in FIG. 4a from the position of rest of FIG. 4b. When the stator 23 is reversely polarized, the rotor poles $N_1$ and $N_3$ are repelled by a force that acts the rotor 21 to move in the same direction of rotation overcoming the repulsive force between the rotor pole $N_2$ and the intermediate stator pole $23b$ which acts the rotor to move in the opposite direction. Thus, upon successive polarization of the stator 23 in alternate senses, the rotor 21 continues to rotate by the step of 36°. Since the starting position of the rotor 21 at the instant of each polarization of stator 23 is biased or displaced in the direction of rotation from the position in which the rotor comes to rest by the previous polarization, easy direction of rotation is established prior to subsequent polarization of the stator and thus the likelihood of the rotor starting to rotate in the opposite direction is completely eliminated.

It is to be noted that if the stator 23 is polarized to the N pole with the rotor 21 being positioned as shown in FIG. 4a, the rotor will be caused to move by the angular extent "x" in the opposite direction until the rotor pole $S_1$ and $S_3$ come to alignment with the center axes $A_1$ and $A_2$, respectively. Upon termination of such polarization, the biasing force is again generated to restore the rotor to the previous position. Therefore, the direction of rotation is the same as the direction of displacement of the intermediate stator pole $23b$ from the bisecting line C.

Figure 5:
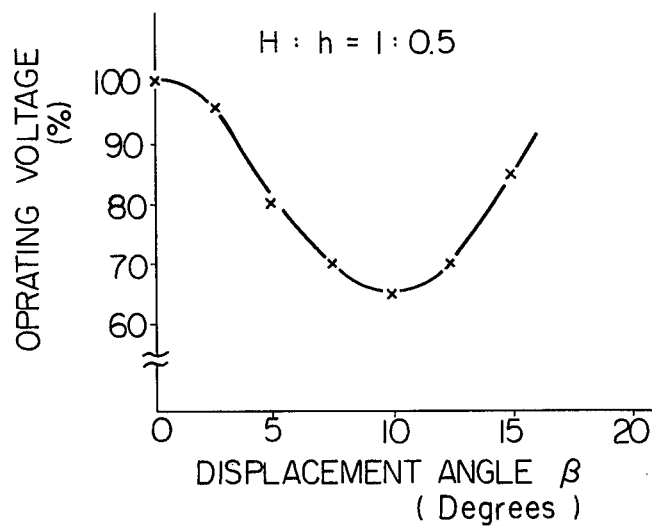
FIG. 5 is a graphical representation of the operating performance of the embodiment of the invention showing the operating voltage of the motor as plotted against the angular displacement of the auxiliary stator pole.

With the stepping motor constructed as shown in FIG. 2, it was found that a preferred value of the displacement angle $\beta$ lie in a range from 5° to 15° which means that the ratio of $\gamma$ to $\beta$ lie in a range from 1:0.14 to 1:0.41. Also, it was found that a preferred value of ratio of arcuate extents "H" to "h" lie in a range from 1:0.25 to 1:0.66 and its most preferred value is 1:0.5. FIG. 5 graphically demonstrates the improved operating characteristic of the stepping motor constructed with its stator poles having an arcuate extent ratio (H/h) of 1:0.5 and wherein the minimum operating voltage is plotted against the displacement angle $\beta$. The operating voltage is represented by the percentage of the rated operating voltage required of the motor constructed to have a displacement angle of 0° which is equivalent to the prior art motor of FIG. 1. It will be appreciated that the present embodiment having a displacement angle of 10° is capable of operating on a voltage level as low as 30 to 40% below the rated value of the prior art motor. Similar operating characteristics have been obtained with the stepping motor having a different number of rotor poles from the present embodiment so far as the motor substantially has the ratio of $\gamma$ to $\beta$ within the range as specified above.

The low voltage capability and the rotor's easy direction of rotation are the result of the displacement of the rotor with respect to the main stator poles during their non-polarized periods and thus assure reliable operation of the motor under the most severe electrical and mechanical environments such as voltage drops and mechanical shocks which frequently occur in automotive vehicles. It is further noted that since the displacement of rotor is solely determined by the structure end displacement angle of the intermediate stator poles 23b and 23b', the present invention permits a simple magnetization process in which the circumference of the rotor is magnetized to opposite polarities of the same degree of magnetization at equal spacing and a conventional stamping process with which the stator is easily formed into shape to within the allowable range of mechanical tolerances.

Figure 6:
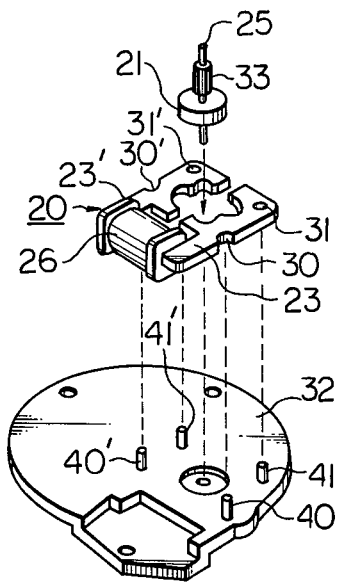
FIG. 6 is an exploded view of the embodiment of FIG. 2 with a base plate of a timekeeping mechanism showing structural relationship therebetween when assembled.
Figure 7:
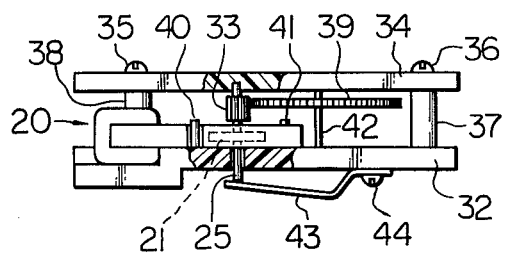
FIG. 7 is a side view of the embodiment assembled in the timekeeping mechanism.

For purposes of mounting the stepping motor of the present invention on a structural member of a timepiece for automotive use to drive the timekeeping mechanism of the timepiece, the stator 22 is shaped into a generally rectangularly contoured configuration and formed with semicircular recesses 30 and 30' and circular holes 31 and 31' as illustrated in FIG. 2. These recesses and holes are provided in such positions that do not materially reduce the cross section of the passage of magnetic flux. As best illustrated in FIG. 6, the motor 20 is mounted on a base plate 40 formed of a thermoplastic material which is integrally formed with positioning pins 40, 40' and 41, 41' in corresponding positions of the recesses 30, 30' and holes 31, 31', respectively. These pins are used both as a guide for placing the motor in position and as a means for securing the motor to the base plate 40 when the top of these pins is fused and pressed to provide a gripping engagement with the stator. The rotor 21 is mounted on a shaft 25 having a pinion 33 in mesh with a gear 39 mounted on a pivot shaft 42 (FIG. 7). The shaft 25 has its one end pivoted to a second base plate 34 secured to the base plate 32 by set screws 35 and 36 with spacers 37 and 38 therebetween. The other end of the shaft 25 extends through the base plate 32 to project from the underside thereof to which a leaf spring 43 formed of phosphor bronze is secured at one end by a set screw 44, the other end of the spring 43 being in resilient engagement with the projecting end of the pivot shaft 25 to bias it along its axis to the support plate 34. The shaft 42 is pivotally mounted between the plates 32 and 34. The stepping motion of the rotor 21 is transmitted through the gear train to drive the gear 39 which may be coupled operatively with the timekeeping mechanism of the clock, it being understood that further explanation of the timekeeping mechanism is unnecessary since such mechanism is well known in the art. Due to the resilient axial mounting of the rotor 21, any vibration of the rotor in rotational or axial direction resulting from its stepping movement can be effectively suppressed by the leaf spring 43. Thus, vibrational movement of the second hand of the timepiece due to the stepping movement of the rotor can be eliminated.

Figure 8:
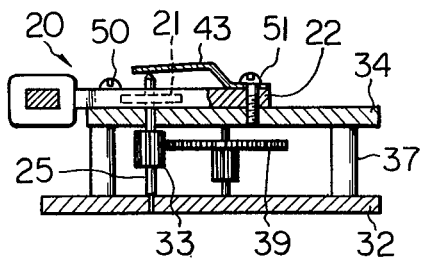
FIG. 8 is a side view of a modified arrangement of FIG. 7.

In a modification of FIG. 7 shown in FIG. 8, the stepping motor 20 is mounted on the upper base plate 34 using set screws 50 and 51 rather than the pins 40 and 41, and the pivot shaft 25 is resiliently supported by the leaf spring 43. The leaf spring 43 is secured at one end to the stator 22 by set screw 51 at the same time when the stator 22 is secured to the base plate 34.

What is claimed is:

1. A stepping motor for a timekeeping mechanism, comprising:
   a rotor formed of ferromagnetic material having a plurality of circumferentially arranged, substantially equally spaced apart poles having alternately opposite polarities; and
   a stator having at least two main poles, an auxiliary pole disposed in proximity to the circumference of the rotor, and a winding adapted to be energized by periodic current pulses for polarizing said main poles in opposite polarities to each other at periodic intervals, the circumferential position of each of said main poles being such that each main pole when polarized is capable of alignment with a corresponding one of the rotor poles of the opposite polarity to the polarity of said main stator pole, said auxiliary stator pole being angularly displaced from a position of alignment with another rotor pole when said main stator poles are in alignment with the corresponding rotor poles, said auxiliary stator pole having a circumferential extent smaller than a circumferential extent of each of said main stator poles.

2. A stepping motor as claimed in claim 1, wherein said stator comprises first and second pairs of first and second main poles, and first and second auxiliary poles, the first main pole of each pair being disposed in a position diametrically opposite to the second main pole of the other pair, the first and second main stator poles of each pair being polarized upon energization of said winding in opposite polarity to the polarity of the first and second main stator poles of the other pair so that each main stator pole of each pair being capable of alignment with corresponding ones of the rotor poles of the opposite polarity, each of said first and second auxiliary stator poles being disposed in a position angularly intermediate said first and second main stator poles and angularly displaced from a position of alignment with another rotor pole when said main stator poles of each pair are in alignment with said corresponding rotor poles.

3. A stepping motor as claimed in claim 2, wherein said auxiliary stator poles are diametrically opposite to each other.

4. A stepping motor as claimed in claim 2, wherein the ratio of the circumferential extent of each of said main stator poles to the circumferential extent of each of said auxiliary stator pole ranges from 1:0.25 to 1:0.66.

5. A stepping motor as claimed in claim 2, wherein the center axis of each of said auxiliary stator poles extends to the center of rotation of said rotor at an angle to a line bisecting an angle formed between the center axes of the adjacent main stator poles, the ratio of said angle to an angle formed between the center axes of adjacent ones of the permanent magnets of the rotor is in a range from 0.14:1 to 0.41:1.

6. A stepping motor as claimed in claim 2, wherein the ratio of the circumferential extent of each of said main stator poles to the circumferential extent of each of said auxiliary stator pole ranges from 1:0.25 to 1:0.66 and wherein the center axis of each of said auxiliary stator poles extends to the center of rotation of said rotor at an angle to a line bisecting an angle formed between the center axes of the adjacent main stator poles, the ratio of said angle to an angle formed between the center axes of adjacent ones of the rotor poles is in a range from 0.14:1 to 0.41:1.

7. A stepping motor as claimed in claim 2, wherein the rotor poles are 10 in number.

8. A stepping motor as claimed in claim 2, wherein each of said first and second pairs of first and second main stator poles and each of said first and second auxiliary stator poles are integrally formed together by a structural member having a generally rectangular outer configuration, said structural member having a hole at a corner thereof and a cutout portion in one side thereof for securing the structural member to a base plate of the timekeeping mechanism.

9. A stepping motor as claimed in claim 8, wherein the base plate includes a plurality of pins formed of thermoplastic material for engaging said hole and cut-out portion.

10. A stepping motor as claimed in claim 1, wherein said rotor includes a pivot shaft and means for resiliently biasing the pivot shaft along the length thereof to suppress vibration of said rotor.

11. A stepping motor as claimed in claim 10, wherein said resilient means comprises a leaf spring, and further comprising means for securing said structural members of the stator to said base plate and securing, said leaf spring at one end thereof to said structural members of the stator.

* * * * *